United States Patent [19]

Ostrowski et al.

[11] 4,319,820
[45] Mar. 16, 1982

[54] AUTO/MANUAL FOCUS CONTROL INHIBIT/OVERRIDE

[75] Inventors: John C. Ostrowski, Maynard; Norman D. Staller, Beverly, both of Mass.

[73] Assignee: Polaroid Corporation, Cambridge, Mass.

[21] Appl. No.: 25,088

[22] Filed: Mar. 29, 1979

Related U.S. Application Data

[63] Continuation of Ser. No. 838,581, Oct. 3, 1977, abandoned.

[51] Int. Cl.³ .................... G03B 3/10; G03B 17/04; G03B 17/38
[52] U.S. Cl. ................................ 354/187; 354/195; 354/266; 354/288
[58] Field of Search ............... 354/158, 187, 198, 266, 354/268, 25, 163, 195, 83, 288, 25 A, 25 P, 25 N; 352/139, 140; 250/201, 204; 325/102; 353/101; 356/3, 4, 5; 350/46, 255, 187; 192/65

[56] References Cited

U.S. PATENT DOCUMENTS

| 3,224,351 | 12/1965 | Strasser | 350/187 X |
|---|---|---|---|
| 3,482,500 | 12/1969 | Thomas | 352/140 |
| 3,522,764 | 8/1970 | Biber | 354/195 |
| 3,683,777 | 8/1972 | Miyagawa | 354/25 |
| 3,834,796 | 10/1974 | Komine | 350/187 |
| 3,871,756 | 3/1975 | Stieringer et al. | 352/140 |
| 4,005,460 | 1/1977 | Mizukawa | 354/195 X |
| 4,016,579 | 4/1977 | Lewis, Jr. | 354/187 X |
| 4,057,327 | 11/1977 | Kumazawa | 350/187 |
| 4,153,903 | 5/1979 | Pizzuti et al. | 354/288 X |

*Primary Examiner*—L. T. Hix
*Assistant Examiner*—William B. Perkey
*Attorney, Agent, or Firm*—John J. Kelleher

[57] ABSTRACT

In a variable focus lens system in general, or in a photographic camera having such a system in particular, wherein said system includes means for both automatically and manually focusing a subject image at a focal plane, means are provided for disabling the operation of said automatic focusing means during manual focus and immediately prior thereto.

13 Claims, 7 Drawing Figures

AUTO/MANUAL FOCUS CONTROL INHIBIT/OVERRIDE

This is a continuation of application Ser. No. 838,581, filed Oct. 3, 1977, now abandoned.

BACKGROUND OF THE INVENTION

1. Field of the Invention

The present invention relates to variable focus lens systems having both automatic and manual focusing means in general, and to such lens systems for photographic cameras, in particular.

2. Description of the Prior Art

Variable focus lens systems having coupled rangefinders, such as those found in certain photographic cameras, are well known in the prior art. The most widely used coupled rangefinder is that of the manually actuated optical type that uses triangulation to determine the distance to the subject to be photographed, which is more commonly referred to as subject distance. Coupled rangefinders that automatically determine subject distance by utilizing radiant or acoustical energy reflected from said subject and then transfer or couple the distance derived by such means to the variable focus lens system of a camera to position said lens system to the correct in-focus position, are also known in the prior art. One such automatic system utilizing reflected acoustical energy is described in U.S. Pat. No. 3,522,764 to BIBER et al.

When utilizing a lens focusing system of the type described in the above-mentioned patent, certain conditions may exist that could render such a focusing system ineffective. For example, an acoustical rangefinder cannot effectively focus the variable focus lens system of a camera on a subject to be photographed if such a subject is separated from the camera by a windowpane, especially if such a pane was in relatively close proximity to said camera and said subject was relatively remote. This problem is briefly mentioned in the above-mentioned BIBER et al. patent at Col. 8, lines 4–6. In such a situation, acoustical energy would be reflected from the windowpane, incorrectly indicating that the subject distance was substantially less than its true distance. This erroneous distance information supplied by the acoustical rangefinder would then cause the variable focus lens system to form an out of focus image at its focal plane which, in the case of a camera, would result in an out of focus photograph. This problem could be avoided if the variable focus lens system or camera having such a system had both manual and automatic focus controls. A manually operated optical type coupled rangefinder, for example, is not rendered ineffective if utilized to focus on a subject through transparent media such as a windowpane.

If a variable focus lens system and, specifically, a variable focus lens system in a photographic camera has both manual and automatic focus controls as mentioned above, wherein said focus controlling means are mechanically coupled to one another in a driving relationship, intentional or unintentional actuation of the manual focus actuating means while automatically focusing said variable focus lens system may interfere with the automatic focus control system's ability to correctly focus said camera and, in addition, such actuation of the manual focus control system may overstress structural components of both focusing systems. Simultaneous actuation of the manual and automatic focus control systems can be avoided if the manual focus actuating means is provided with a protective barrier or cover that impedes access to the manual focus actuating means. Such a cover would have to be displaced before the manual focus system could be actuated which would prevent inadvertent actuation of said focus system.

When a camera having both manual and automatic focus controls is in its manual focus control mode, it would be desirable to be able to deenergize the automatic focus control system, to the greatest extent possible, in order to minimize the electrical power drain from the camera's battery system caused by standby electrical loads in said automatic focus control system. When in the manual mode, most of the power consumed by the automatic focus control system normally serves no useful purpose and unnecessarily shortens camera battery life.

In a variable focus lens system having automatic focus control, it is normally necessary to provide gearing between the actuator in the automatic focus control system and the variable focus lens in order to, for example, transmit the appropriate force to said lens and/or to avoid mechanically overloading said actuator. If a variable focus lens system has both manual and automatic focus control and if said manual and automatic focus controls are mechanically coupled to one another through, for example, a variable focus lens, the inertial and frictional loading provided by the automatic focus actuator through its associated focusing gears may make it difficult to manually focus. It would be desirable if means were provided to automatically remove or uncouple at least a portion of the loading created by said actuator and its associated gearing, to facilitate manual focusing.

In addition, in a folding type camera having both manual and automatic focus controls, it would also be desirable to have the automatic focus control mode automatically selected when such a camera is placed in its stored or fully collapsed state so that further focusing by a camera operator would not be necessary before a camera exposure cycle could be initiated once said camera is subsequently placed in its fully erected or picture taking position. If such a camera remained in its previously selected manual mode when in a fully collapsed or stored state, an out of focus photograph could result from an incorrect assumption that said camera was in its automatic mode.

SUMMARY OF THE INVENTION

In accordance with the present invention, a variable focus lens system is provided having both manual and automatic focus controls that are mechanically coupled to one another in a driving relationship, wherein means are provided for manually overriding said automatic focus control. Automatic focus control override is initiated by movement of a displaceable barrier or cover impeding access to the actuating means for said manual focus control; the movement of said cover causing power to be removed from a portion of the automatic focus control system. In addition, where manual focusing of said variable focus lens system is made difficult by the presence of a relatively high inertia and/or high friction mechanism such as a coupled rotary actuator or the like, a clutch is provided for disconnecting said rotary actuator from the variable focus lens system; said disconnection being initiated by displaceable cover movement. When the present lens system is included in a folding type photographic camera, the folding action repositions the displaceable cover to where it again impedes access to the actuating means for said manual focus control and, in addition, returns said camera to its automatic focus control mode.

DESCRIPTION OF THE PREFERRED EMBODIMENTS

Figure 1:
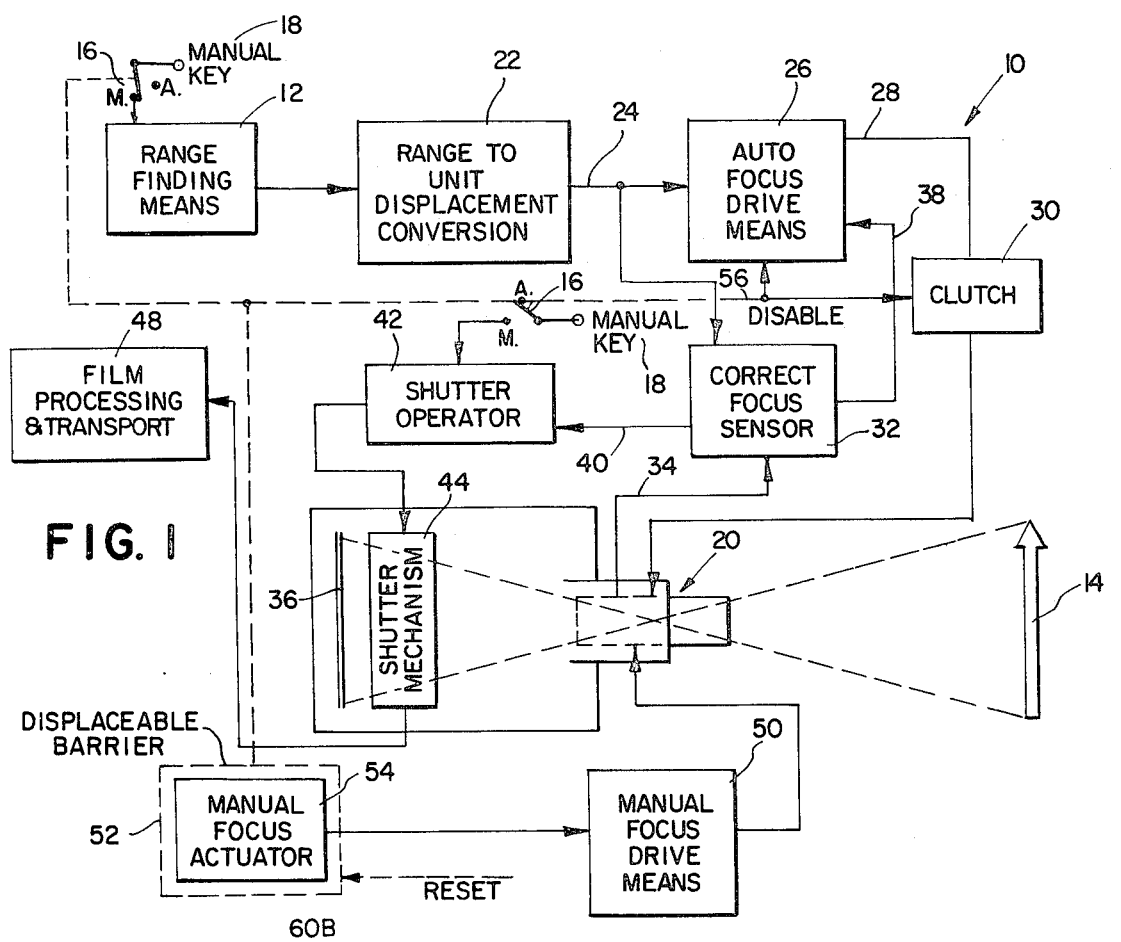
FIG. 1 is a functional block diagram of a photographic camera having both manual and automatic focus controls and having a manually actuated automatic focus control override that is constructed in accordance with a preferred embodiment of the present invention.

Referring now to the drawings and specifically to FIG. 1, a functional block diagram of self-developing photographic camera 10, of the variable focus type, having both manual and automatic focus controls and having a manually actuated automatic focus control override that is constructed in accordance with a preferred embodiment of the present invention is depicted. In FIG. 1, functional block 12 represents the means for determining the distance to subject 14 from said photographic camera 10. This rangefinding means can have more than one form but in this, the preferred embodiment, the form is that of an acoustical type rangefinder of the type that is described in copending application Ser. No. 840,802 by J. Muggli, now abandoned, which is assigned to the assignee of the present invention.

With automatic/manual mode select switch 16 in its automatic position or "A", the rangefinding sequence is initiated by a camera operator depressing manual key 18 which may take the form of an electrical switch. In such a system, keying of rangefinding means 12 by manual key 18 causes acoustical energy to be transmitted toward subject 14 from said rangefinding means 12. This transmitted acoustical energy is subsequently reflected by said subject 14 and rangefinding means 12 detects the resultant echo. The length of time taken for this acoustical or sonic energy to reach subject 14 and return to rangefinding means 12 is a fairly good indication of actual subject 14 distance. Once subject distance is determined, this distance is converted into the proper form for positioning variable focus lens 20 of camera 10 to the correct subject-in-focus position by range-to-unit displacement converter 22 which compensates for the extremely nonlinear relationship between the axial position of a lens at which a subject is in focus and the actual distance to said subject from said lens. When this conversion is complete, lens drive signal 24 is sent to autofocus drive means 26 to initiate the movement of variable focus lens 20 toward its correct subject-in-focus position. Upon receipt of range signal 24, autofocus drive means 26 generates lens actuating force 28 which is applied to variable focus lens 20 through clutch 30. At this point, variable focus lens 20 starts to move toward its correct subject-in-focus position. Correct focus sensor 32 monitors the actual movement of variable focus lens 20 through path 34. When variable focus lens 20 has correctly focused the image of subject 14 on focal plane 36 of camera 10 as determined by the appropriate relationship between lens drive signal 24 and the lens position signal received through path 34, correct focus sensor 32 sends an autofocus lens drive termination signal to autofocus drive means 26 through path 38.

In addition to sending an autofocus lens drive termination signal to autofocus drive means 26, correct focus sensor 32 sends exposure initiate signal 40 to shutter operator 42. Shutter operator 42, in turn, trips shutter mechanism 44. Once shutter mechanism 44 has been fully actuated, film processing and transport cycle 48 of self-developing camera 10 is initiated.

If for some reason it is desirable to manually focus said variable focus lens 20, the manual focus mode is selected by placing automatic/manual mode select switch 16 in the manual position or to "M". To actuate manual focus drive means 50, displaceable barrier or cover 52 shrouding or impeding access to manual focus actuator 54 is manually moved from its protective position where it impedes ready access to manual focus actuator 54 to its displaced position where it is spaced from and no longer impedes such access to said manual focus actuator 54. Displaceable cover 52 is mechanically linked to automatic/manual mode select switch 16. Therefore, movement of said cover 52 from its protective to its displaced position will also move said switch 16 from its automatic to its manual position or from "A" to "M". Movement of switch 16 between its automatic and manual positions is normally accomplished by the movement of displaceable cover 52. Movement of displaceable cover 52 also sends disable signal 56 to autofocus drive means 26 and to clutch 30. Disable signal 56 causes a portion of the electrical power being supplied to autofocus drive means 26 to be removed, and, in addition, causes the disengagement of clutch 30. Removing a portion of the power being supplied to autofocus drive means 26 while the camera 10 focus control system is in the manual mode, reduces unnecessary power drain from the batteries (not shown) of photographic camera 10. In addition, disable signal 56 causes clutch 30 to mechanically disconnect the actuator that is included in autofocus drive means 26 from variable focus lens 20, which substantially lessens the amount of inertial and frictional loading on said lens 20. By reducing such loading, considerably less effort is required to actuate manual focus actuator 54 in order to focus lens 20 to its correct subject-in-focus position. Once the manual focusing of variable focus lens 20 is complete, an exposure cycle is initiated by depressing manual key 18. With automatic/manual mode select switch 16 placed in its manual position by the displacement of protective cover 52, a manual exposure initiate signal will be sent to shutter operator 42 by key 18 only, because of the position of said switch 16. The operating sequence of shutter mechanism 44 and film processing and transport cycle 48 is the same as when the focus control system is in the automatic mode, once shutter operator 42 is manually actuated by manual key 18.

To return the focus control system of camera 10 to the automatic focus control mode, displaceable cover 52 is manually reset from its displaced or manual focus position, to its protective or autofocus position where it again impedes access to manual focus actuator 54. The resetting of displaceable cover 52 to its protective position removes disable signal 56 from autofocus drive means 26 and from clutch 30 and returns automatic/manual mode select switch 16 to "A" or to automatic. Removing disable signal 56 from autofocus drive means 26 and clutch 30 causes said drive means to become reenergized, and causes clutch 30 to mechanically couple the rotary actuator in autofocus drive means 26, to variable focus lens 20. Once automatic/manual mode select switch 16 is returned to the automatic mode by placing displaceable cover 52 in its protective position, autofocus drive means 26 returns the entire focusing system to a predetermined reference or starting position for subsequent automatic operation. The above-described and referenced acoustical rangefinder is now ready to automatically determine the distance to a subject to be photographed and to couple or transfer this acoustically determined distance to the variable focus lens system 20 of camera 10. Depressing manual key 18 after automatic/manual mode select switch 16 has been placed in the automatic mode or to "A" will initiate an automatic rangefinding sequence and film exposure cycle, respectively.

As previously discussed, autofocus drive means 26 includes a rotary actuator for automatically positioning variable focus lens 20. Also, the manual positioning of said variable focus lens 20 can be accomplished by the movement of manual focus actuator 54 and manual focus drive means 50. The specific details of the rotary actuator in automatic focus drive means 26 and the manner in which it is coupled to variable focus lens 20, and the specific details of manual focus actuator 54 and manual focus drive means 50 can be more clearly understood by referring to FIGS. 2 and 3.

Figure 2:
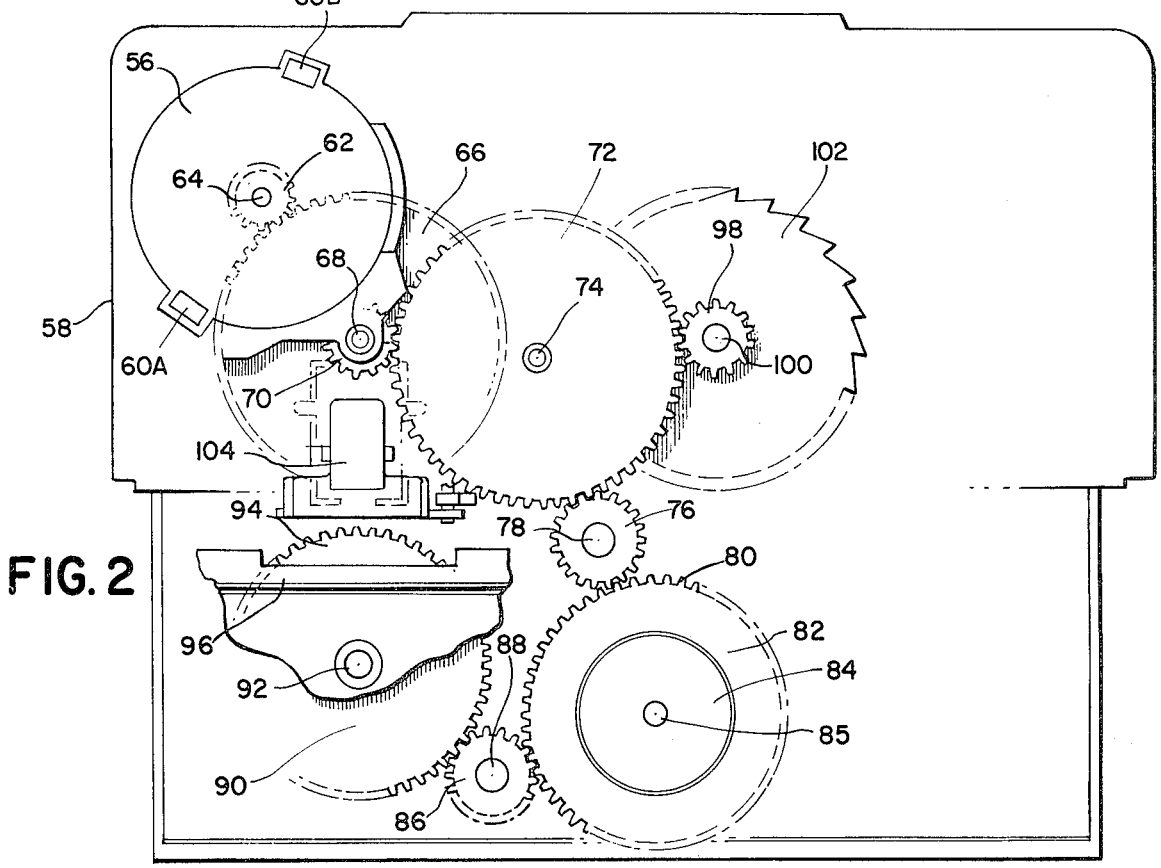
FIG. 2 is a front elevational view of the manual and automatic focus control drive mechanism, and the manual focus wheel displaceable cover of the present invention.
Figure 3:
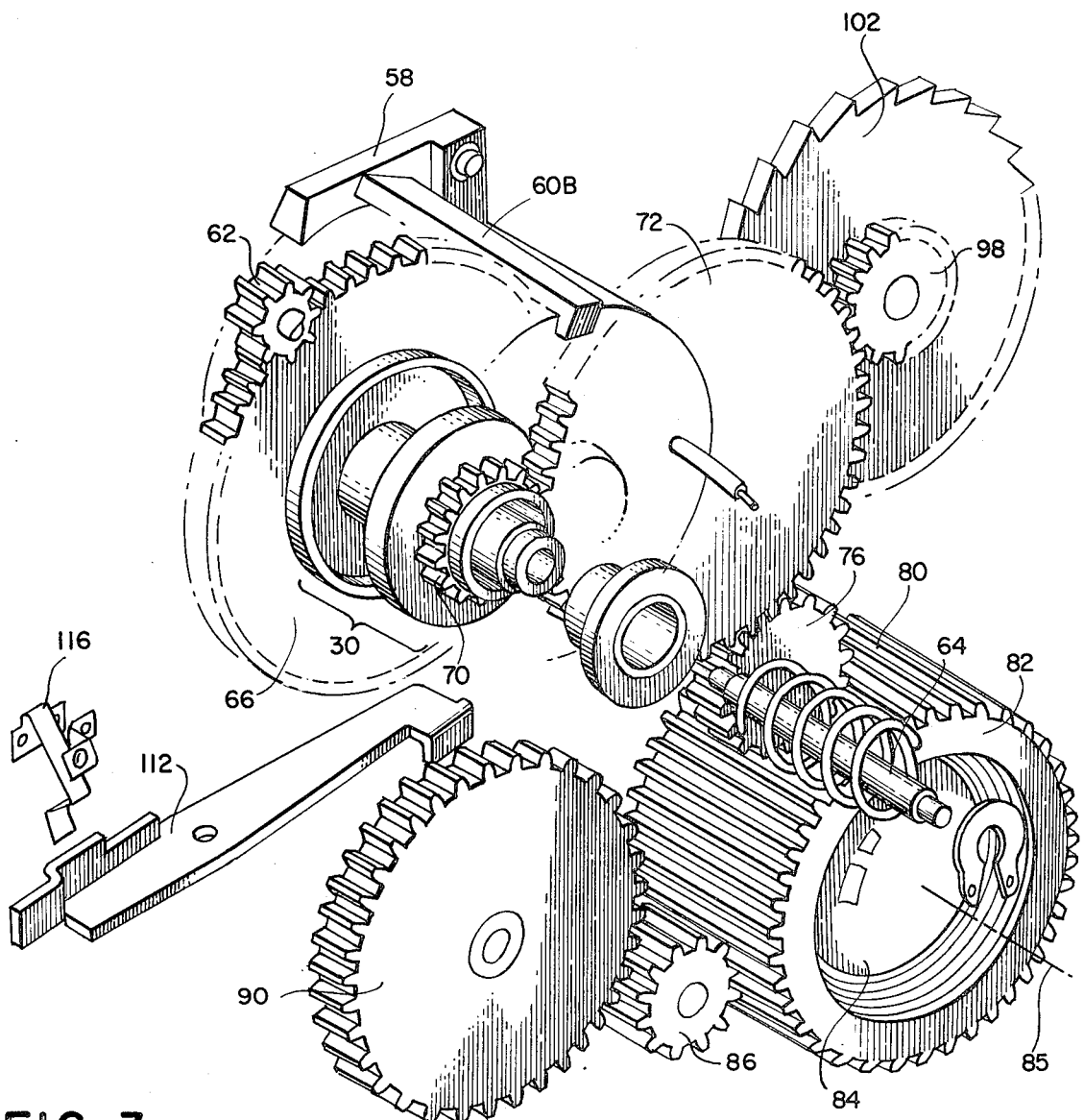
FIG. 3 is an exploded perspective view of the manual and automatic focus control drive mechanisms and the manual focus displaceable cover of the present invention, that is depicted in FIG. 2.
Figure 3:
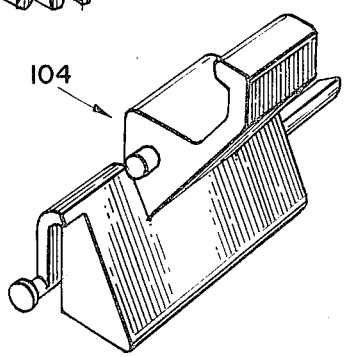

In FIGS. 2 and 3, rotary actuator or drive motor 56, of circular cross section, is mounted in a fixed position with respect to camera 10 support structure 58 by clip-type flexible fingers 60A, 60B, having hooked ends, which extend from said structure 58. Drive motor pinion gear 62 is mounted on drive motor shaft 64 and is in a fixed relation with respect thereto. Main drive gear 66 is mounted for rotation on shaft 68; said shaft being in a fixed relation with respect to camera 10 support structure 58. The peripheral teeth of gear 62 and the peripheral teeth of gear 66 are in a meshed relation such that rotation of one of said gears causes rotation of the other. Main drive pinion gear 70 is mounted for rotation about shaft 68; said gear 70 being selectively maintained in a fixed position with respect to main drive gear 66 by clutch 30. Second idler gear 72 is mounted for rotation on shaft 74, said shaft 74 being in a fixed relation with respect to support structure 58. The peripheral teeth of second idler gear 72 and the peripheral teeth of main drive pinion gear 70 are in a meshed relation such that rotation of one of said gears causes rotation of the other. First idler gear 76 is mounted for rotation on shaft 78; said shaft being in a fixed relation with respect to support structure 58. Lens or ring gear 80 forms a portion of lens mount 82 of lens 84 and is mounted for rotation with said lens 84. Lens gear 80 is mounted for rotation about and for movement along principal image forming axis 85 of said lens 84; said axis being in a fixed relation with respect to support structure 58. The peripheral teeth of lens gear 80 are in a meshed relation with respect to the peripheral teeth of first idler gear 76. Therefore, rotation of first idler gear 76 will cause lens gear 80 rotation, and vice versa.

In addition to being in a meshed relation with respect to first idler gear 76, lens gear 80 is also in a meshed relation with respect to manual focus idler gear 86. Manual focus idler gear 86 is mounted for rotation on shaft 88; said shaft 88 being in a fixed relation with respect to support structure 58. Manual focus actuator wheel 90 is mounted for rotation on shaft 92; said shaft being in a fixed relation with respect to support structure 58. The peripheral teeth of manual focus actuator wheel 90 are in a meshed relation with the peripheral teeth of manual focus idler gear 86. A portion of the peripheral teeth 94 of manual focus actuator wheel 90 extend beyond housing portion 96 of camera 10, for manual movement by a camera 10 operator.

In addition to main drive pinion gear 70 and first idler gear 76, the peripheral teeth of second idler gear 72 are also in a meshed relation with respect to lens 84 motion sensing pinion gear 98. Lens motion sensing pinion gear 98 is mounted for rotation on shaft 100. Lens motion sensing wheel 102 is also mounted for rotation on shaft 100 and is in a fixed relation with respect to said lens motion sensing gear 98. If means are provided for determining the rotational position of wheel 102 with respect to some reference point, the axial position of lens 84 will be known with respect to said reference point because of a known effective gear ratio between wheel 102 and lens 84 which is provided by gears 98, 72, 76 and 80, and a known linear relationship between lens 84 axial and rotational movement.

From the foregoing description it can be seen that drive motor 56 and manual focus actuator wheel 90 are mechanically coupled to one another in a driving relationship in that rotation of drive motor pinion gear 62 by drive motor 56 will cause manual focus actuator wheel 90 to rotate. Conversely, manual rotation of manual focus actuator wheel 90 by a camera 10 operator will cause drive motor pinion gear 62 and shaft 64 of drive motor 56 to rotate. Because of this just-described driving relationship between drive motor 56 and manual focus actuator wheel 90, means must be provided to impede access to extending teeth 94 of manual focus actuator wheel 90 when drive motor 56 is positioning lens 84 so that said positioning is not interferred with.

Access to extending teeth 94 of manual focus actuator wheel 90 is impeded by displaceable cover 104 which functions as a protective shroud over said extending teeth 94. The physical movement of displaceable cover 104 and the movement of the manual focus override components with which it cooperates will be more clearly understood by referring to FIG. 4.

Figure 4:
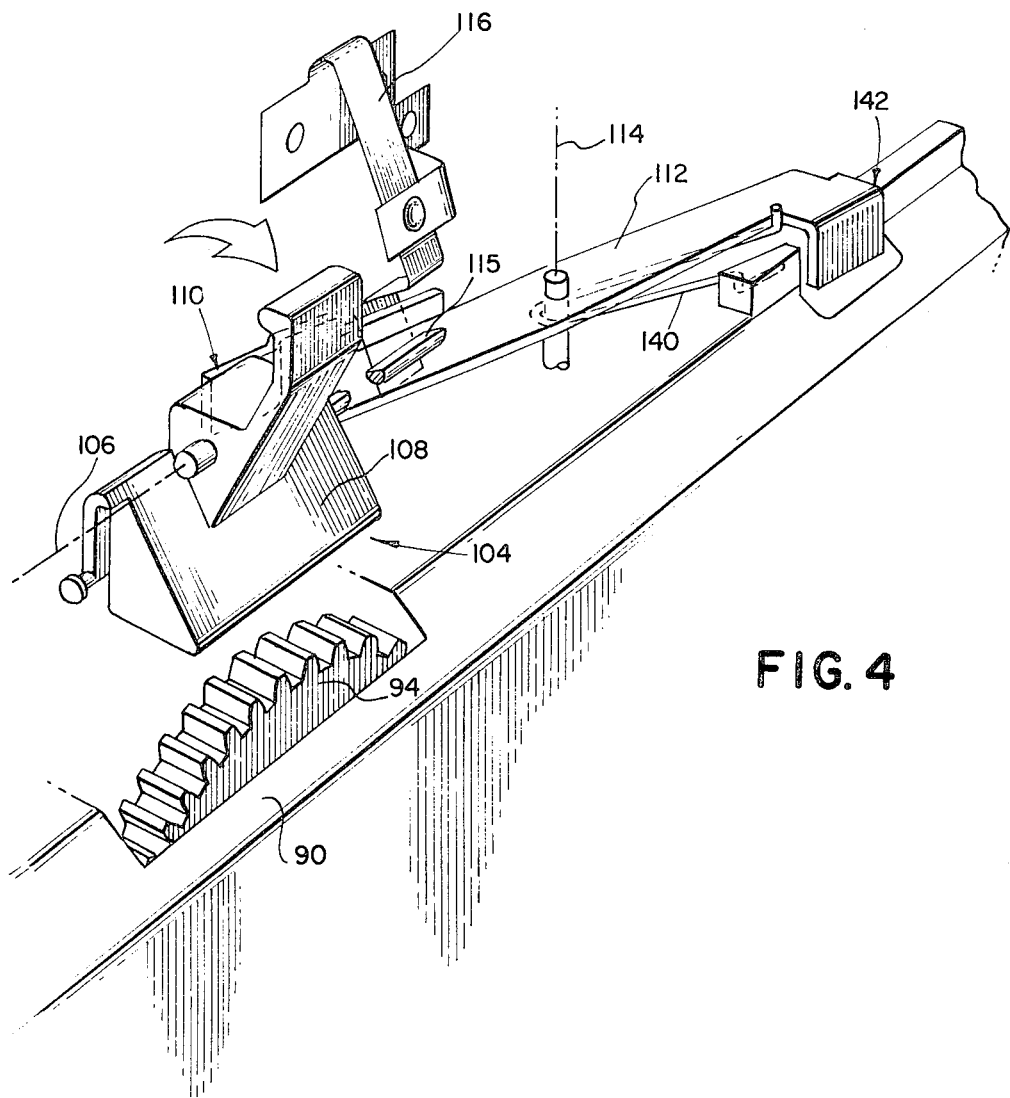
FIG. 4 is a perspective view of the protective cover and associated manual override components of the focus control system of the present invention.

In FIG. 4, displaceable cover 104 is shown in the position where it impedes access to extending teeth 94 of manual focus actuator wheel 90. Displaceable cover 104 is mounted for rotation about axis 106, said axis being in a fixed relation with respect to support structure 58 (FIG. 2). Manually moving lower end 108 of displaceable cover 104 into the housing of camera 10 uncovers extending teeth 94 of manual focus actuator wheel 90 permitting ready actuation of said manual focus wheel 90. In addition to uncovering extending teeth 94 of manual focus wheel 90, displaceable cover 104 engages end 110 of lever 112 causing said lever 112 to rotate about axis 114. The function of lever 112 and its specific details will be discussed later herein. As end 108 of cover 104 moves inward towards the interior of camera 10, extension 115 of said end 108 engages and actuates electrical switch 116 causing the removal of a portion of the electrical power being supplied to the automatic focus control portion of camera 10. Switch 116 is held in its actuated position by extension 115 of displaceable cover 104, said cover being held in its displaced position by an overcenter spring (not shown) mounted between cover 104 and the housing of camera 10.

As previously discussed, the inertial and frictional loading contributed by rotary actuator 54 (FIG. 2) makes the manual focusing of variable focus lens system 20 (FIG. 1) difficult at best. These just-mentioned loads are removed by clutch 30 when cover 104 is moved from the position where it impedes access to manual focus wheel 90 to its manual focus position, for manually focusing said variable focus lens 20. The operation of clutch 30 and the specific structural details thereof can be more clearly understood by referring to FIGS. 5 and 6 of the drawings.

Figure 5:
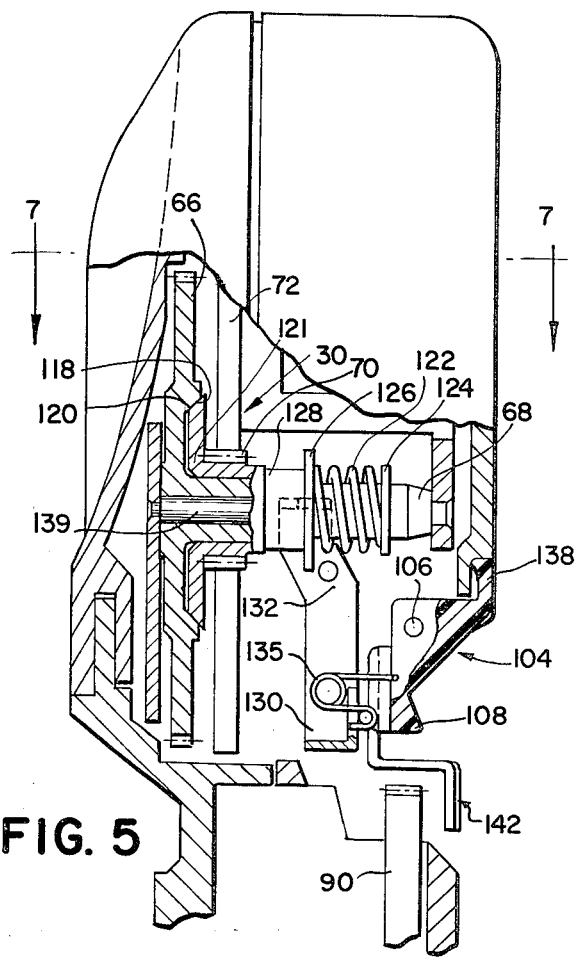
FIG. 5 is a side elevational view of the friction clutch associated with the automatic focus control drive motor of the present invention, shown it its engaged or coupled state.

In FIG. 5, clutch 30 is shown in the engaged or coupled position where a rotary force applied to main drive gear 66 is coupled to second idler gear 72 by main drive pinion gear 70 and clutch 30. The mechanical connection provided by clutch 30 is made by the engagement of sloping surface 118 in a face of main drive gear 66 engaging the sloping peripheral face 120 of the flange portion of flanged tube 121 of clutch 30. Flanged tube 121 is in a fixed relation with respect to main drive pinion gear 70 and is coaxially and rotatably mounted with respect to the extending axial portion of main drive gear 66. Surfaces 118 and 120 are frictionally locked to one another by the force of coil spring 122. One end of coil spring 122 presses against clip 124 which is frictionally attached to the surface of tube 68. The other end of coil spring 122 presses against flange or platen 126 of cylindrical tube 128, said cylindrical tube 128 being keyed to tube 68 for rotation therewith. Tube 68 passes through flanged tube 121, cylindrical tube 128, spring 122, and is attached to drive gear 66, all of said members being rotatable with respect to shaft 139 which is part of camera structure 10. With surface 118 of gears 66 and surface 120 of flanged tube 121 in clutch 30 locked together in frictional engagement, a rotational force applied to main drive gear 66 will be transmitted to second idler gear 72 through main drive pinion gear 70 and clutch 30.

Figure 6:
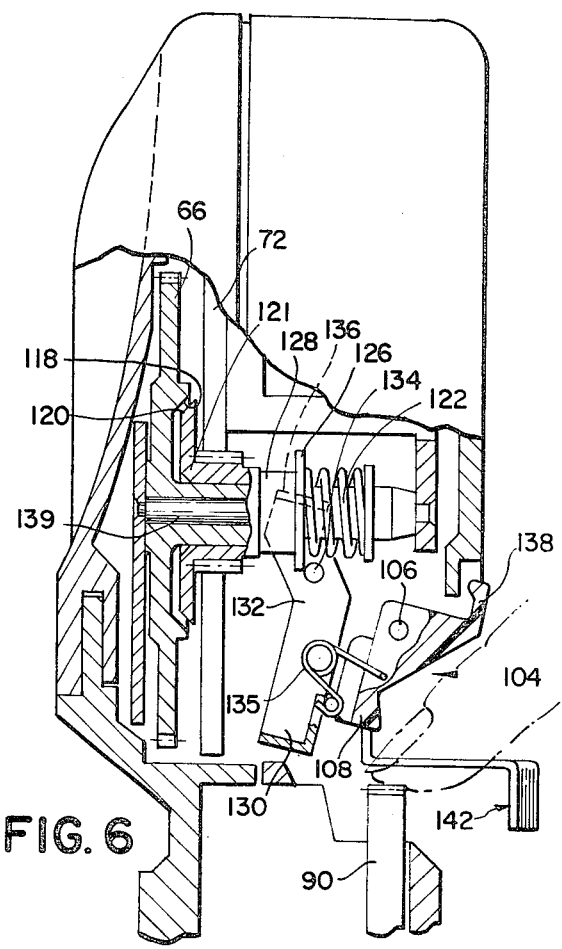
FIG. 6 is a side elevational view of the friction clutch depicted in FIG. 5, shown in its disengaged or uncoupled state.

To manually focus, an operator pushes end 108 of displaceable cover 104 into the housing of camera 10. With reference to FIG. 6, pushing end 108 of displaceable cover 104 into the housing of camera 10 causes said cover 104 to rotate about axis 106 to its displaced position and engage lower end 130 of lever 132, causing said lever 132 to rotate about axis 134. Displaceable cover 104 is maintained in its displaced position by an overcenter spring 135 when cover 104 is pressed into the housing of camera 10. As said lever 132 rotates about axis 134, upper end 136 of said lever 132 engages platen 126 of cylindrical tube 128 causing said cylindrical tube 128 and platen 126 to compress coil spring 122 and to remove pressure between frictional surface 120 of flanged tube 121 and frictional surface 118 of main drive gear 66, disconnecting any rotary forces applied to main drive gear 66 through second idler gear 72. To reengage clutch 30, upper end 138 of cover 104 is pressed into the housing of camera 10 causing said cover 104 to rotate counterclockwise about axis 106 and to restore end 108 of cover 104 to the position where it again impedes access to manual focus actuator wheel 90.

Figure 7:
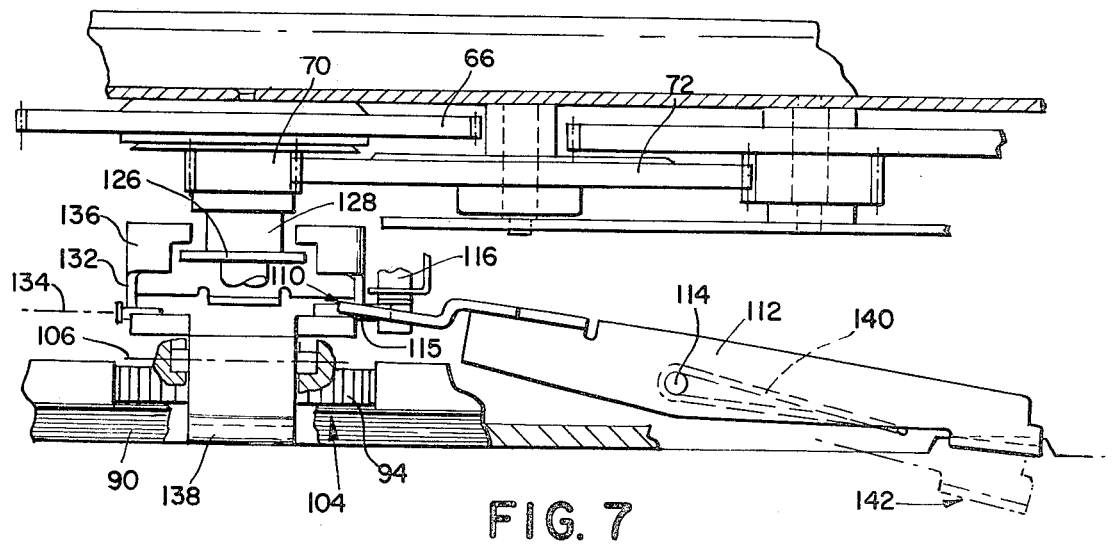
FIG. 7 is a sectional view taken on the line 7—7 in FIG. 5.

In a folding type camera, clutch 30 can also be reengaged by the folding action of such a camera. The specific details of the reengagement of clutch 30 and the repositioning of cover 104 can be more clearly seen by referring to FIGS. 4 and 7. As previously discussed, lever 112 rotates about axis 114 when cover 104 engages end 110 of said lever 112. Rotational movement of lever 112 by cover 104 is resisted by spring 140 whose spring force must be overcome before lever 112 will rotate. Rotation of lever 112 under the influence of cover 104 causes end 142 of lever 112 to extend beyond the housing of camera 10. By placing camera 10 in the fully folded or collapsed position, the housing of said camera 10 engages end 142 of lever 112 causing said lever 112 to rotate about axis 114. As lever 112 rotates about axis 114, end 110 of said lever 112 engages cover 104 causing said cover 104 to rotate about axis 106 from its displaced position to a position where it again impedes access to extending teeth 94 of manual focus actuator wheel 90. Additionally, the rotation of cover 104 causes the reengagement of clutch 30 and the actuation of electrical switch 116, said actuation electrically enabling the camera 10 automatic focus control system.

GENERAL CONSIDERATIONS

The present invention has been described as one that is primarily for use with a variable focus lens system having both automatic and manual focus controls wherein said automatic focus control includes an acoustical type rangefinder for determining subject distance. However, it should be understood that the present invention has application to any variable focus lens system having both manual and automatic focus control wherein said controls are coupled to one another in a driving relationship and where actuation of the manual focus control actuator while focusing automatically, will interfere with said automatic focusing. Disconnecting portions of the electrical load created by the automatic focus control system while manually focussing and disconnecting the automatic focus control actuator are also useful for such variable focus lens systems and the extent of their use would depend upon the extent of the electrical and mechanical loading included in the automatic focus control associated with such lens systems.

The term objective lens as used herein means a lens or a system of lenses that form an image of an object. This term is not limited to a single lens of a lens system that is nearest to the subject to be viewed or to be photographed.

The term portion as used herein means either all or less than all of the quantity under consideration. This term is not limited to fractional parts of the quantity under consideration and can and may very well include all of said quantity.

The term electrical power as used herein means either signal or the basic supply power, or both. Such a term is not limited to the nonsignal type of electrical power.

The term automatic focus control as used herein means that once it has been manually initiated, this particular control system will automatically determine the distance to the subject under consideration by sensing energy, whether acoustical or radiant, reflected from said subject and then couple this distance information, in the appropriate form, to a variable focus lens system for the purpose of positioning said lens system to its correct subject-in-focus position. The automatic focus control system, as the term is used herein, will both determine subject distance, and position the variable focus lens system to the correct position once an automatic focus control sequence has been initiated, without further involvement with the entity that has initiated said sequence.

It will be apparent to those skilled in the art from the foregoing description of our invention that various improvements and modifications can be made in it without departing from its true scope. The embodiments described herein are merely illustrative and should not be viewed as the only embodiments that might encompass our invention.

What is claimed is:

1. An improved optical system of the type including:
   a support housing,
   an adjustable focus lens mounted on said housing for focusing an image of a remote object at a focal plane,
   energizable first means for deriving a signal representative of the distance between said remote object and said optical system,
   energizable second means responsive to said subject distance signal for effecting focusing movement of said lens to a particular focus position, said second means including,
      an electrically energizable lens movement generating actuator responsive to said subject distance signal, and
      means for coupling said actuator to said adjustable focus lens, said coupling means including a clutch actuatable between a coupled state and an uncoupled state,
   wherein the improvement comprises:
   said coupling means is positioned on said housing such that at least a portion thereof is accessible for direct manual movement; and
   a displacebly mounted cover mounted for displacement between a first position where it precludes direct manual access to said portion of said coupling means and a second position where it does not preclude direct manual access thereto, said clutch being actuatable between its said coupled and uncoupled states by the movement of said displaceably mounted cover between its said first and second positions, said energizable second means being precluded from effecting focusing movement of said lens by said actuator when said cover is displaced to its said second position where it permits direct manual access to and movement of said coupling means.

2. An optical system as defined in claim 1, wherein said energizable first means includes an electrical switch actuatable between an open state where it precludes energization of said first means and a second closed state where it enables energization of said first means, said switch being actuated between its said open and closed states by the movement of said displaceably mounted cover between its said first and second positions.

3. An optical system as defined in claim 1, wherein said energizable second means includes an electrical switch actuatable between an open state where it precludes energization of said second means and a second closed state where it enables energization of said second means, said switch being actuated between its said open and closed states by the movement of said displaceably mounted cover between its said first and second positions.

4. An optical system as defined in claim 1, wherein said energizable first means includes an electrical switch actuatable between an open state where it precludes energization of said first means and a second closed state where it enables energization of said first means, said energizable second means includes an electrical switch actuatable between an open state where it precludes energization of said second means and a second state where it enables energization of said second means, and wherein said first means electrical switch is actuatable between its said open and closed states, said second means electrical switch is actuatable between its said open and closed states.

5. An improved camera of the type including:
   a housing member, said member enclosing a film plane in a light-tight exposure chamber,
   an adjustable focus lens mounted on said housing member for focusing an image of a remote object at said film plane,
   energizable first means for deriving a signal representative of the distance between said remote object and said camera,
   energizable second means responsive to said subject distance signal for effecting focusing movement of said lens to a particular focus position, said second means including,
      an electrically energizable lens movement generating actuator responsive to said subject distance signal, and
   means for coupling said actuator to said adjustable focus lens, said coupling means including a clutch actuatable between a coupled state and an uncoupled state, wherein the improvement comprises:
   said coupling means is positioned on said housing member such that at least a portion thereof is accessible for direct manual movement; and
   a displaceably mounted cover mounted for displacement between a first position where it precludes direct manual access to said portion of said coupling means and a second position where it does not preclude direct manual access thereto, said clutch being actuatable between its said coupled and uncoupled states by the movement of said displaceably mounted cover between its said first and second positions, said energizable second means being precluded from effecting focusing movement of said lens by said actuator when said cover is displaced to its said second position where it permits direct manual access to and movement of said coupling means.

6. A camera as defined in claim 5, wherein said energizable first means includes an electrical switch actuatable between an open state where it precludes energization of said first means and a second closed state where it enables energization of said first means, said switch being actuated between its said open and closed states by the movement of said displaceably mounted cover between its said first and second positions.

7. A camera as defined in claim 5, wherein said energizable second means includes an electrical switch actuatable between an open state where it precludes energization of said second means and a second closed state where it enables energization of said second means, said switch being actuated between its said open and closed states by the movement of said displaceably mounted cover between its said first and second positions.

8. A camera as defined in claim 5, wherein said energizable first means includes an electrical switch actuatable between an open state where it precludes energization of said first means and a second closed state where it enables energization of said first means, said energizable second means includes an electrical switch actuatable between an open state where it precludes energization of said second closed means and a second closed state where it enables energization of said second means, and wherein said first means electrical switch is actuatable between its said open and closed states, said second means electrical switch is actuatable between its said open and closed states.

9. A camera as defined in claim 5, wherein said energizable second means includes means for deriving a signal indicating that said adjustable focus lens has been positioned to a focus position where a subject to be photographed is in focus at said film plane, wherein said camera includes a shutter mechanism and a manually operative shutter mechanism actuator, and wherein said shutter mechanism is responsive to a subject-in-focus signal when said cover is displaced to its said first position, and responsive to said manual shutter mechanism actuator, but precluded from being responsive to a subject-in-focus signal when said cover is displaced to its said second position.

10. A photographic camera comprising:
a variable focus objective lens for focusing a subject image at a focal plane in a light-tight exposure chamber in a housing of said camera;
means for deriving a signal representative of the distance between said camera and a subject to be photographed remote therefrom;
means responsive to said subject distance signal for effecting focusing movement of said objective lens to focus an image of said subject at said focal plane, said focusing movement means including a clutch actuatable between a coupled state and an uncoupled state;
means responsive to the movement of a manual focus member for effecting focusing movement of said objective lens, for subject image focusing, said manual focus member including,
a wheel having teeth at the periphery thereof, said wheel being rotatable about an axis that is in a fixed relation with respect to said camera housing, said wheel being positioned in said housing such that only those teeth that are necessary for convenient movement of said wheel by an operator of said camera extend beyond said camera housing;
a displaceable barrier rotatable about an axis that is in a fixed relation with respect to said camera housing, said barrier being displaceable between a first position adjacent the extending peripheral teeth of said focus wheel where it impedes manual access to said wheel, and a second position spaced from said wheel where it permits manual access to and movement of said wheel, said clutch being actuatable between its said coupled and uncoupled states by the movement of said displaceable barrier between its said first and second positions; and
means coupled to said displaceable barrier, actuatable between a first state where it enables lens focusing movement in response to said subject distance signal and a second state where it precludes lens focusing movement in response to said subject distance signal, for enabling focusing movement of said lens in response to said subject distance signal when said displaceable barrier is in its said first position and for disabling focusing movement of said lens in response to said subject distance signal when said displaceable barrier is in its said second position.

11. A photographic camera as defined in claim 10 wherein said enabling and disabling means is an electrical switch.

12. A photographic camera as defined in claim 10 wherein said camera is of the folding type and further comprises:
a second member having at least two ends, said second member being rotatable about an axis intermediate of said second member ends, said axis being in a fixed relation with respect to said camera housing,
one end of said second member being engageable with said barrier, another end of said second member being rotatably actuated to extend beyond said camera housing by actuation of said barrier from a position where it impedes access to said toothed wheel, to the displaced position of said barrier where said toothed wheel can be conveniently actuated by a camera operator, said extending second member end being engageable with and actuated by said camera housing when said folding camera is placed in its folded position, the rotational movement of said second member actuating said barrier such that said first end of said barrier is restored to the position where it impedes access to said toothed wheel and changes the state of said enabling and disabling means; and
a spring for maintaining said extending end of said second member in the nonextended position when said folding camera is an unfolded state.

13. A photographic camera as defined in claim 10, wherein said clutch comprises:
a first gear, said gear being mounted for rotation about an axis that is in a fixed relation with respect to said camera housing, said first gear having an elongated axial portion and having a face of relatively high friction material;
a second gear, said second gear being mounted for rotation about said elongated axial portion of said first gear, said second gear having a face of relatively high friction material for engagement with said relatively high friction face of said first gear, said second gear being geared to said objective lens;
a cylindrical tube having a flanged end, said tube being in a fixed position with respect to said second gear, said tube being mounted for rotation with said elongated axial portion of said first gear;
a coil spring coaxially mounted on said elongated axial portion of said first gear, one end of said spring being in a fixed position in at least one axial direction with respect to said elongated axial portion of said first gear, the other end of said coil spring engaging the flanged end of said cylindrical tube, urging the frictional faces of said first and second gears into relative motion preventing frictional engagement; and a lever, having two ends, said lever being rotatable about an axis intermediate of said lever ends, said axis being in a fixed relation with respect to said camera housing, one of said lever ends engaging said flanged end of said cylindrical tube, the other end of said lever engaging said barrier such that movement of said first end of said barrier from a position where said end impedes access to said toothed wheel, to the displaced position of said barrier where said first end of said barrier is spaced from said toothed wheel, causing said flanged end of said cylindrical tube to compress said coil spring and remove said second gear from relative motion preventing frictional engagement with said first gear.

* * * * *